United States Patent [19]
Beylin et al.

[11] Patent Number: 5,930,510
[45] Date of Patent: Jul. 27, 1999

[54] METHOD AND APPARATUS FOR AN IMPROVED CODE OPTIMIZER FOR PIPELINED COMPUTERS

[75] Inventors: Boris Beylin, Palo Alto; Krishna Subramanian, Cupertino, both of Calif.

[73] Assignee: Sun Microsystems, Inc., Palo Alto, Calif.

[21] Appl. No.: 08/752,683

[22] Filed: Nov. 19, 1996

[51] Int. Cl.$^6$ ........................................ G06F 9/44
[52] U.S. Cl. ............................................ 395/709
[58] Field of Search .................... 395/709, 705, 395/706

[56] References Cited

U.S. PATENT DOCUMENTS

| | | | |
|---|---|---|---|
| 5,230,053 | 7/1993 | Zaiki | 395/706 |
| 5,448,737 | 9/1995 | Burke et al. | 395/709 |
| 5,491,823 | 2/1996 | Ruttenberg | 395/706 |
| 5,551,039 | 8/1996 | Weinberg et al. | 395/709 |
| 5,659,754 | 8/1997 | Grove et al. | 395/709 |
| 5,664,193 | 9/1997 | Tirumalai | 395/705 |
| 5,761,514 | 6/1998 | Aizikowitz et al. | 395/709 |
| 5,768,596 | 6/1998 | Chow et al. | 395/709 |
| 5,809,308 | 9/1998 | Tirumalai | 395/709 |
| 5,835,776 | 11/1998 | Tirumalai et al. | 395/709 |
| 5,867,711 | 2/1999 | Subramanian et al. | 395/709 |

OTHER PUBLICATIONS

"Enhanced Modulo Scheduling for Loops with Conditional Branches", Subramanian et al, IEEE, pp. 170–179, 1992.

Aho, A.V., et al., "Code Generation" and Code Optimization in *Compilers, Principals, Techniques, and Tools*, pp. 513–637, Addison–Wesley Publishing Co., Reading, MA (1985).

Rau, B.R., and Glaeser, C.D., "Some Scheduling Techniques and an Easily Schedulable Horizontal Architecture for High Performance Scientific Computing," *IEEE Trans. on Computers*, pp. 183–197 (1981).

Zima, H., and Chapman, B., "Data Dependence" in *Supercompilers for Parallel and Vector Computers*, pp. 112–172, Addison–Wesley Publishing Co., Reading, MA (1990).

Primary Examiner—James P. Trammell
Assistant Examiner—Matthew Smithers
Attorney, Agent, or Firm—Dehlinger & Assoc.; David P. Lentini

[57] ABSTRACT

Apparatus, methods, systems and computer program products are disclosed to provide improved optimizations of single-basic-block-loops. These optimizations include improved scheduling of blocking instructions for pipelined computers and improved scheduling and allocation of resources (such as registers) that cannot be spilled to memory. Scheduling of blocking instructions is improved by pre-allocating space in the scheduling reservation table. Improved scheduling and allocation of non-spillable resources results from converting the resource constraint into a data dependency constraint.

24 Claims, 10 Drawing Sheets

METHOD AND APPARATUS FOR AN IMPROVED CODE OPTIMIZER FOR PIPELINED COMPUTERS

BACKGROUND OF THE INVENTION

1. Field of the Invention

This invention relates to the field of optimizing compilers for computer systems. Specifically, this invention is a new and useful optimization method, apparatus, system and computer program product for optimizing the order of computer operation codes resulting from the compilation of a program loop.

2. Background

Early computers were programmed by rewiring them. Modem computers are programmed by arranging a sequence of bits in the computer's memory. These bits perform a similar (but much more useful) function as the wiring in early computers. Thus, a modern computer operates according to the binary instructions resident in the computer's memory. These binary instructions are termed operation codes (opcodes). The computer fetches an opcode from the memory location pointed to by a program counter. The computer's central processor unit (CPU) evaluates the opcode and performs the particular operation associated with that opcode. Directly loading binary values in memory to program a computer is both time consuming and mind numbing. Programming languages simplify this problem by enabling a programmer to use a symbolic textual representation (the source code) of the operations that the computer is to perform. This symbolic representation is converted into binary opcodes by compilers or assemblers. By processing the source code, compilers and assemblers create an object file (or object module) containing the opcodes corresponding to the source code. This object module, when linked to other object modules, results in executable instructions that can be loaded into a computer's memory and executed by the computer.

A target program's source consists of an ordered grouping of strings (statements) that are converted into a binary representation (including both opcodes and data) suitable for execution by a target computer architecture. A source program provides a symbolic description of the operations that a computer will perform when executing the binary instructions resulting from compilation and linking of the source. The conversion from source to binary is performed according to the grammatical and syntactical rules of the programming language used to write the source. This conversion from source to binary is performed by both compilers and assemblers.

One significant difference between assemblers and compilers is that assemblers translate source code statements into binary opcodes in a one-to-one fashion (although some "macro" capabilities are often provided). On the other hand, compilers transform source code statements into sequences of binary opcodes (object code) that, when executed in a computer, perform the operation described by the source. Some compilers also provide an option to output the assembler source that represents the object code.

The symbolic statements processed by a compiler are more general than those processed by an assembler and each compiled statement can produce a multitude of opcodes that, when executed by a computer, implement the operation described by the symbolic statement. Unlike an assembler, that maintains the essential structural organization of the source code when producing binary opcode sequences, a compiler may significantly change the structural organization represented by the source when producing the compiled binary. However, no matter how much the compiler changes this organization, the compiler is restricted in that the compiled binary, when executed by a computer, must provide the same result as the programmer described using the source language—regardless of how this result is obtained.

Many modern compilers can optimize the binary opcodes resulting from the compilation process. Due to the design of programming languages, a compiler can determine structural information about the program being compiled. This information can be used by the compiler to generate different versions of the sequence of opcodes that perform the same operation. (For example, enabling debugging capability, or optimizing instructions dependent on which version of the target processor the source code is compiled for.) Some optimizations minimize the amount of memory required to hold the instructions; other optimizations reduce the time required to execute the instructions.

Some advantages of optimization are that the optimizing compiler frees the programmer from the time consuming task of manually tuning the source code. This increases programmer productivity. Optimizing compilers also encourage a programmer to write maintainable code because manual tuning often makes the source code less understandable to other programmers. Finally, an optimizing compiler improves portability of code because source code tuned to one computer architecture may be inefficient on another computer architecture. A general discussion of optimizing compilers and the related techniques used can be found in *Compilers: Principles, Techniques and Tools* by Alfred V. Aho, Ravi Sethi and Jeffrey D. Ullman, Addison-Wesley Publishing Co. 1988, ISBN 0-201-10088-6, in particular chapters 9 and 10, pages 513–723.

FIG. 1 illustrates the general structure of a modern compiler as indicated by a general reference character 100. Such a compiler 100 consumes a target programs' source information 101 by a compiler front-end segment 103. This compiler front end segment 103 processes the syntax and semantics of the source information 101 according to the rules of the programming language applicable to the source information 101. The compiler front end segment 103 generates at least one version of an "intermediate" code representation 104 of the source information 101. For loop constructs, the intermediate code representation generally includes data structures that either represent, or can be used to create, data dependency graphs (DDGs). This intermediate representation 104 is then optimized by an intermediate representation optimizer segment 105. The intermediate representation optimizer segment 105 operates on, and adjusts, the intermediate code representation 104 of the source information 101 to optimize the execution of a program in a variety of ways well understood in the art. The intermediate representation optimizer segment 105 generates an optimized intermediate representation 106. A code generator segment 107 consumes the optimized intermediate representation 106, performs low level optimizations, allocates physical registers and generates an assembler source code and/or object code module 109 from the optimized intermediate representation 106. The object code comprises binary computer instructions (opcodes) in an object module. The assembler source code is a series of symbolic statements in an assembler source language. Both the assembler source code and the object code are targeted to a particular computer architecture (for example, SPARC, X86, IBM, etc.).

DDGs embody the information required for an optimizer to determine which statements are dependent on other statements. The nodes in the graph represent statements in the loop and arcs represent the data dependencies between nodes. In particular, the scope of a variable extends from a "def" of the variable to a "use" of the variable. A def corresponds to an instruction that modifies a variable (an instruction "defines" a variable if the instruction writes into the variable). A use corresponds to an instruction that uses the contents of the variable. For example, the instruction "x=y+1;" "def"s x and "use"s y. An arc in the DDG extends from the def of a variable to the use of the variable. DDGs are described in chapter 4 of *Supercompilers for Parallel and Vector Computers*, by Hans Zima, ACM press, ISBN 0-201-17560-6, 1991.

As mentioned above, the code generator segment 107 performs low level optimizations and generates either (or both) object code (in the form of object modules) or assembler source code. The intermediate representation of the program generally references virtual registers. That is, the intermediate representation optimizer assumes that the target computer contains an unlimited number of registers. During the operation of the code generator segment 107, these virtual registers are assigned to the physical registers of the target computer. This resource management is performed in the code generator segment 107 by a register allocation (expansion) process. One aspect of the register allocation process is that the contents of physical registers are often "spilled" to memory at various points during the execution of the program so that the limited number of physical registers can be used to hold values of more immediate relevance to the program at those various points. Those values that are spilled to memory are often restored to the registers when the program advances to different points of execution.

One programming construct that can be significantly optimized are single-basic-block-loops (SBB loops). SBB loops have a determinable number of iterations (for example, a compile-time computable or known symbolic tripcount). SBB loops do not contain any control flow structures, functions, procedures, or other constructs that change the flow of execution within the loop. Such loops have only one entry point, one exit point, and no branches within the loop.

Software pipelining is a technique for scheduling the execution of instructions in SBB loops. The software pipelining technique schedules different overlapping iterations of the loop body to exploit the computer's underlying parallel computation units. The execution schedule consists of a prologue, a kernel, and an epilogue. The prologue initiates the first p iterations thus starting each iteration. A steady state is reached after the first p*II cycles, where II is the initiation interval where each initiated iteration is executing instructions in parallel. In this steady state or kernel, one iteration of the loop is completed every II cycles. Once the kernel initiates the last iteration in the loop, the epilogue completes the last p iterations of the loop that were initiated by the kernel.

Some computers contain predicate instructions. Predicate instructions can be used to convert a loop that contains branching opcodes into a SBB loop. For example, a floating point conditional evaluation instruction sets a predicate condition. A floating point "move on predicate condition" instruction evaluates the condition and executes accordingly—but without any branching operation.

FIGS. 2a and 2b illustrate the concepts of SBB loops, and the advantages of using predicate instructions to convert non-SBB loops into SBB loops. FIG. 2a illustrates a non SBB loop as indicated by a general reference character 200.

The loop initiates at a code block 201. At the "bne" instruction of the block 201, execution can continue either at a code block 203 or at a code block 205 depending on how the "bne" instruction of the block 201 evaluates its arguments. This branch within the loop violates the SBB loop requirements. If the execution continues to the code block 203, execution must jump past the code in the code block 205. This is another instance that violates the SBB loop requirements. Regardless of which path is taken at the "bne" instruction of the block 201, execution continues at a code block 207. The code block 207 includes instructions that determine whether another iteration of the loop should be executed or whether the loop completes.

FIG. 2b illustrates how predicate instructions can convert the non-SBB loop 200 into a SBB loop as illustrated by a general reference character 210. A code block 211 that is similar to the code block 201 is modified to define a predicate p that is associated with a condition (here the condition is that r1 is not equal to zero). The instructions within a code block 213 are assigned a predicate. A predicate includes an identifier and a type. The predicate for the code block 213 is id=p and type=F (false). Thus while the instruction in the code block 213 will only execute if the predicate condition is false, there is no branching within the loop. This same occurs for a code block 215, except that the required predicate condition for execution is true instead of false. Thus execution sequentially continues through the basic blocks 211, 213, 215 where instructions are conditionally executed dependent on whether the predicate is satisfied. Execution completes at a code block 217 where the predicate p is consumed and the loop is conditionally iterated again. Each of the basic blocks 211, 213, 215, 217 now comprise a SBB loop 219 that can be optimized using existing modulo scheduling methods for SBB loops.

A difficulty with predicate instructions is that there are a limited number of predicate registers and often these registers cannot be spilled to memory and restored. Predicate registers are an example of unspillable resources. Thus, these predicate registers are a resource limitation on the scheduling process of the compiler.

Brief Summary of Modulo Scheduling

Modulo scheduling is known in the art and is generally describe in the paper *Some Scheduling Techniques and An Easily Schedulable Horizontal Architecture for High Performance Scientific Computing* by B. R. Rau and C. D. Glaeser, Proceeding of the Fourteenth Annual Workshop on Microprogramming, Advanced Processor Technology Group, ESL, Inc., October 1981, pages 183–198, that is incorporated fully herein by reference. To summarize, the modulo scheduling technique schedules parallel instruction processing by starting a new iteration of a SBB loop prior to completion of a previously initiated iteration of the SBB loop. The concept is to initiate a new iteration of the SBB loop after a fixed interval of time. This time interval is called the initiation interval or the iteration interval (II).

FIG. 2c illustrates a four stage, seven iteration, schedule as indicated by a general reference character 250. Let a single iteration have a scheduled length of TL 251 being the time required to execute the complete iteration. Let the iteration be divided into stages each taking an initiation interval time II 253. The stage count (SC) is defined as SC=[TL/II]. Thus in the situation shown in FIG. 2c, TL=4, and II=1 so that SC=4.

Loop execution begins with a stage 0 255 of a first iteration 257. No other iteration executes concurrently during the first initiation interval 253. After the first initiation interval, the first iteration 257 enters stage 1 and a second iteration 259 enters its stage 0. New iterations join every II until all stages of different iterations are executing concurrently. As the loop approaches termination, no new iterations are initiated and those that are in various stages of progress gradually complete until a last iteration 260 completes.

Loop execution has three phases, a prologue phase 261, a kernel phase 263 and an epilogue phase 265. During the prologue phase 261 and the epilogue phase 265 not all stages of successive iterations execute. All stages of successive iterations execute during the kernel phase 263. The prologue 261 and the epilogue 265 last for (SC−1)*II cycles. If the trip count of the loop is large, the kernel phase 263 will last much longer than the prologue 261 or the epilogue 265 phases. The primary performance metric for a modulo scheduled loop is the initiation interval (II) 253. The value of II is also a measure of the steady state throughput for loop iterations. Smaller II values imply higher throughput. Therefore, the scheduler attempts to derive a schedule that minimizes the value of II. The time to execute n iterations is, T(n)=(n+SC−1)*II. The throughput approaches II as n approaches infinity.

The modulo scheduling process first constructs a data dependence graph (DDG) for the loop. Nodes in this (directed) graph correspond to instructions; and arcs correspond to dependencies between the instructions. Arcs possess two attributes: latency and omega. Latency is the number of processor clocks required to separate the source and the destination. Omega is the iteration distance between the source and destination. (For example: an omega of 0 means that the value is used in the current iteration; an omega of 1 means that the source instruction calculates a value for the destination instruction that is to be used in the next iteration; An omega of 2 means the value is used two iterations after it was calculated.)

The modulo scheduling process then determines the minimum initiation interval (MII) by taking the maximum of two throughput bounds. These bounds are the resource minimum initiation interval (ResmII) and the recurrence minimum initiation interval (RecmII). The ResmII is a bound on the minimum number of cycles needed to complete one iteration of the loop and is based on processor resources. For example, if a loop has ten add operations and the processor can execute at most two add operations per processor clock, then the add unit resource would limit the iteration throughput to, at most, one every five clocks. The ResmII is computed by taking each resource in turn and then taking the maximum of the bounds imposed by each.

The RecmII is a bound based on the minimum number of clocks needed to complete one iteration and is based on dependencies between nodes in the DDG. Cycles in the DDG imply that a value Xj computed in some iteration k is used in a future iteration j and is needed to compute the similarly propagated value in iteration j. These circular dependencies place a limit on how rapidly iterations can execute because computing the values needed in the cycle takes time. For each elementary cycle in the DDG, the ratio of the sum of the latencies (l) to the sum of the omegas (d) is computed. This value limits the iteration throughput because it takes (l) clocks to compute values in a cycle that spans d iterations.

The fixed spacing between overlapped iterations forces a constraint on the scheduler other than the normal constraints imposed by the arcs in the DDG. Note that placing an operation at a time t implies that there exists a corresponding operation in the $k^{th}$ future iteration at t+(k*II). Operations using the same resource must be placed at different times, modulo the II. This is referred to as the "modulo constraint." It states that if an operation uses a resource at time $t_1$ and another operation uses exactly the same resource at time $t_2$, then $t_1$ and $t_2$ must satisfy "$t_1$ modulo II is not equal to $t_2$ modulo II". This scheduling scheme uses a modulo reservation table (MRT) to track resource usage as scheduling occurs.

The scheduler begins by attempting to derive a schedule using the minimum initiation interval defined as II=mII= max(ResmII, RecmII). If a schedule is not found the II is incremented. The process repeats until a schedule is found or an upper limit on II is reached. After scheduling, the kernel has to be unrolled and defs renamed to prevent values from successive iterations from overwriting each other. Unrolling the kernel is the process of creating multiple copies of the kernel in the generated code. The minimum kernel unroll factor (KUF) needed is determined by the longest value lifetime divided by the II because corresponding new lifetimes begin every II clocks. (The lifetime of a value is equal to the time for which a value exists; i.e., from the time its generation is stated (the def) until the last time instant when it is (the use) or could be used. Remainder iterations (up to KUF-1) use a clean-up loop.

Another aspect of the above modulo scheduling is that some computer instructions may not be pipelined in a particular computer architecture. Examples of this type of instruction for some processors are the divide and square root instructions. Thus, a double precision divide may take some significant number of consecutive processor cycles during which no other divide instruction can initiate. Thus, these instructions block on the resource they use.

While the mII calculation considers the resource usage needs of all the instructions in the loop, the mII calculation does not consider any dependencies between instructions. Thus, although the modulo scheduling techniques will assure that there are enough cycles to schedule the loop, these techniques do not assure that sufficient consecutive cycles are available to schedule blocking operations such as the square root and the divide operations. Often, when scheduling loops containing blocking operations, a schedule can not be found at a given II even though such a schedule exists. Thus, the II is incremented and another attempt to schedule occurs. This process results in longer compilations of the target program and less efficient executing code.

FIG. 2d illustrates the process used in an optimizing compiler's code generation segment 107 (of FIG. 1) as indicated by a general reference character 270. The process 270 initiates at a "Start" terminal 271 when evaluating a loop statement. The process 270 continues to an initialize modulo reservation table (MRT) procedure 272. This procedure 272 allocates a table suitable for scheduling the loop's iterations. Then the process 270 continues to an optimization step 273 that performs optimizations well known in the art. After the optimization step 273 completes, the process 270 checks whether an iterative construct, such as a SBB loop, is being optimized at a decision procedure 275. If the decision procedure 275 does not detect a SBB iterative construct, the process continues to a normal scheduling procedure 277. After scheduling completes, the process continues to a virtual register expansion procedure 279. The virtual register expansion procedure 279 allocates physical registers to the virtual registers used by the optimized intermediate representation 106 of the program being compiled and causes the contents of these physical registers to be spilled to memory at appropriate points within the program's execution.

If the decision procedure 275 detects an iterative construct, the process continues to a "SBB Loop SW Pipelining" procedure 281. The operation of this procedure 281 is described above and may result in unrolling the loop's kernel by the kernel unroll factor (KUF) and modulo scheduling the loop's instructions. Execution continues at the virtual register expansion procedure 279.

After the register allocation procedure 279, the process continues to a code generation procedure 283, where the optimized intermediate representation 106 is converted into object code (or optionally assembler source code depending on the user's preference). The process completes through an "End" terminal 285.

From the above description one skilled in the art will understand that the software pipelining process is performed before the register allocation process. Thus, the scheduling process can not determine how many physical registers will be used in the loop. For many types of physical registers, this produces satisfactory results because the contents of the physical registers can be spilled to memory (and then restored back to the physical registers when needed). However predicate registers cannot be spilled to memory. Thus, the scheduling process must both schedule the loop's computer operations and assure that sufficient predicate registers exist to perform the scheduled operations.

Another problem with the above technology is that some computer instructions are not pipelined (blocking instructions). These instructions cause longer compilation times due to the difficulty of locating sufficient consecutive cycles in a partially scheduled iteration. These instructions also result in longer iteration intervals to accommodate placing the blocking instructions in the schedule.

SUMMARY OF THE INVENTION

The present invention provides an economical method, system, apparatus, and computer program product for optimizing single basic block loops by a compiler. One aspect of the invention is a computer controlled method to optimize a loop (having characteristics of a single basic block loop) within a target program. The target program is directed to a target computer architecture that has multiple computation units that facilitate instruction pipelining. The multiple computation units permit two or more instructions to be issued in a single clock cycle within the computer architecture. The single basic block loop describes an iterative construct. This aspect of the invention detects that a single basic block loop statement contains a body statement that results in a def of an unspillable resource. The invention determines a $c\Omega$ value for the iterative construct and converts the def into a data constraint by using the $c\Omega$ value. Finally, the invention schedules the iterative construct.

In another aspect of the invention, a computer system for optimizing a loop (having characteristics of a single basic block loop) is disclosed. The system includes a CPU coupled to a memory. The computer system also includes a compiler system having a code generator segment. The target program (containing the loop) is directed to a target computer architecture that has multiple computation units that facilitate instruction pipelining. The multiple computation units permit two or more instructions to be issued in a single clock cycle within the target computer architecture. The single basic block loop describes an iterative construct. The system also includes a loop detection mechanism that detects that the loop statement contains a body statement that results in a def of an unspillable resource. The system also includes a control omega determination mechanism that determines a value for the control omega for the iterative construct. The system also includes a conversion mechanism that converts the def into a data constraint by using the value of the control omega. The system schedules the iterative construct using the data constraint by using a scheduling mechanism.

Yet a further aspect of the invention is an optimization apparatus for optimizing a loop (having characteristics of a single basic block loop). The apparatus includes a CPU coupled to a memory. The apparatus also includes a compiler system having a code generator segment. The target program (containing the loop) is directed to a target computer architecture that has multiple computation units that facilitate instruction pipelining. The multiple computation units permit two or more instructions to be issued in a single clock cycle within the target computer architecture. The single basic block loop describes an iterative construct. The apparatus includes a loop detection mechanism that detects that the loop statement contains a body statement that results in a def of an unspillable resource. The apparatus also includes a control omega determination mechanism that determines a value for the control omega for the iterative construct. The apparatus also includes a conversion mechanism that converts the def into a data constraint by using the value of the control omega. The system schedules the iterative construct using the data constraint by using a scheduling mechanism.

Yet a further aspect of the invention is a computer program product embedded on a computer usable medium for causing a computer to optimize a loop (having characteristics of a single basic block loop). When executed on a computer, the computer readable code causes a computer to effect a loop detection mechanism, a control omega determination mechanism, a conversion mechanism and a scheduling mechanism. Each of these mechanisms having the same functions as the corresponding mechanisms described above for the optimization apparatus.

Another aspect of the invention is a computer controlled method for optimizing a loop (having characteristics of a single basic block loop). The target program is directed to a target computer architecture that has multiple computation units that facilitate instruction pipelining. The multiple computation units permit two or more instructions to be issued in a single clock cycle within the computer architecture. The single basic block loop describes an iterative construct. The invention detects that the loop statement contains at least one body statement that invokes a blocking operation. Then, the invention pre-allocates a dedicated scheduling region that is reserved for the blocking operation. Next, the invention schedules the blocking operation within the dedicated scheduling region.

In another aspect of the invention, a computer system for optimizing a loop (having characteristics of a single basic block loop) is disclosed. The system includes a CPU coupled to a memory. The computer system also includes a compiler system having a code generator segment. The target program (containing the loop) is directed to a target computer architecture that has multiple computation units that facilitate instruction pipelining. The multiple computation units permit two or more instructions to be issued in a single clock cycle within the target computer architecture. The single basic block loop describes an iterative construct. The system includes a compiler system having a code generator segment. The system also includes a blocking statement detection mechanism that detects a body statement (that invokes a blocking operation) within a loop statement. The system contains an allocation mechanism that pre-allocates at least one dedicated scheduling region. This pre-allocated scheduling region is reserved for the blocking operation. The system also contains a scheduling mechanism that schedules the blocking operation within the dedicated scheduling region.

In yet another aspect of the invention, an optimizing apparatus for optimizing a loop (having characteristics of a single basic block loop) is disclosed. The apparatus includes a CPU coupled to a memory. The apparatus also includes a compiler system having a code generator segment. The target program (containing the loop) is directed to a target computer architecture that has multiple computation units that facilitate instruction pipelining. The multiple computation units permit two or more instructions to be issued in a single clock cycle within the target computer architecture. The single basic block loop describes an iterative construct. The apparatus includes a compiler system having a code generator segment. The apparatus also includes a blocking statement detection mechanism that detects a body statement (that invokes a blocking operation) within a loop statement. The apparatus contains an allocation mechanism that pre-allocates at least one dedicated scheduling region. This pre-allocated scheduling region is reserved for the blocking operation. The apparatus also contains a scheduling mechanism that schedules the blocking operation within the dedicated scheduling region.

Yet a further aspect of the invention is a computer program product embedded on a computer usable medium for causing a computer to optimize a loop (having characteristics of a single basic block loop). When executed on a computer, the computer readable code causes a computer to effect a blocking statement detection mechanism, an allocation mechanism, and a scheduling mechanism. Each of these mechanisms having the same functions as the corresponding mechanisms described above for the optimization apparatus.

The foregoing and many other aspects and advantages of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

Figure 1:
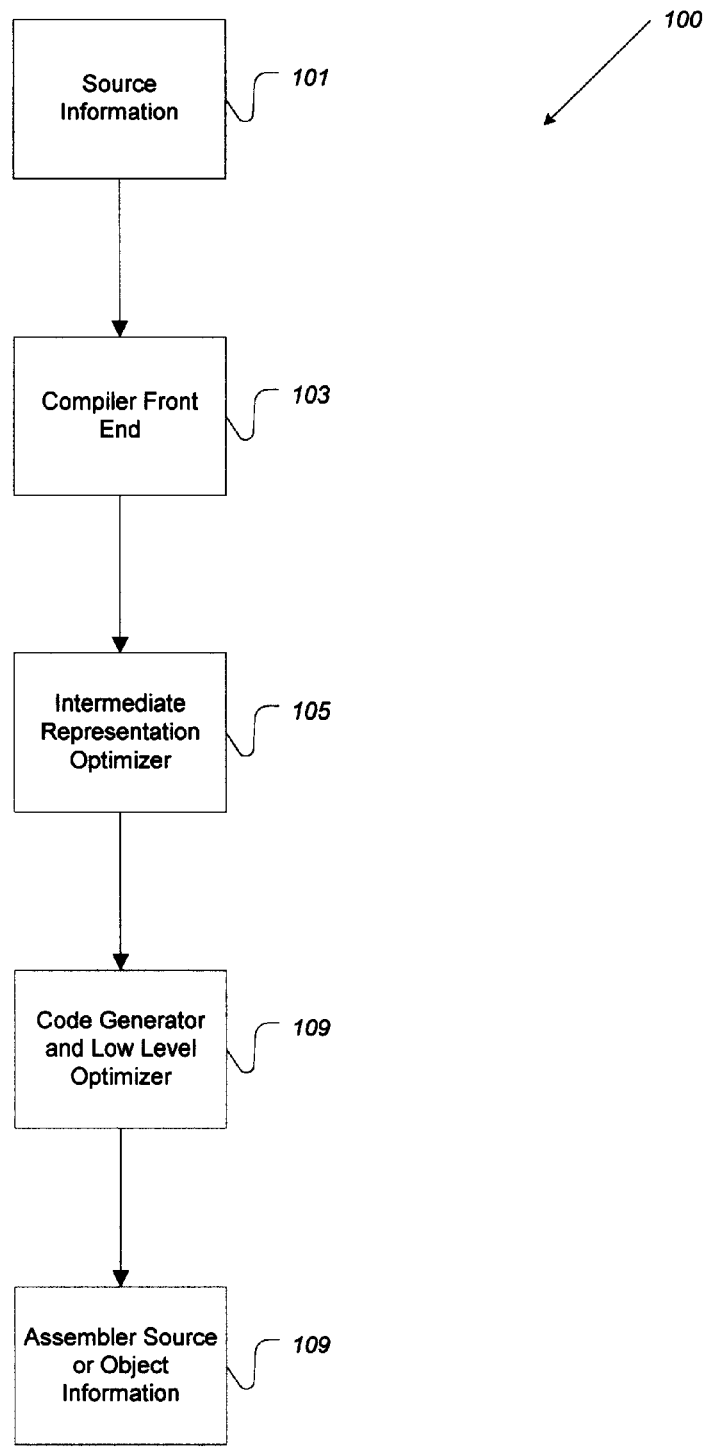
FIG. 1a illustrates a compiler organization.

The following "notations and nomenclature" are provided to assist in the understanding of the present invention and the preferred embodiments thereof.

Data Dependency Graph—A data dependency Graph (DDG) is a data structure in the computer memory that represents how statements within a loop depend on other statements. These graphs include nodes that represent computer operations and arcs that represent dependencies between the nodes. These dependencies include flow dependencies, data dependencies and anti-dependencies. Data structures within the compiler that represent data dependency graphs are often represented by diagrams using circles for nodes corresponding to statements and arcs between the nodes representing dependencies.

Loop—A loop is a programming language construct that describes an iterative process where statements within the body of the loop define operations that are repeatedly executed by a computer. In other words a compiled loop, when executed in a computer, causes the computer to repetitively iterate through the operations described by statements contained in the loop until some completion condition is satisfied. As such, loop statements represent an iterative construct that provides an iterative control process coupled to other statements contained within the body of the loop (body statements). Loops, as optimized by the invention, are limited to single-basic-block-loops (SBB loops). That is, loops that do not contain any control flow structures, functions, procedures, or other constructs that change the flow of execution within the loop. Such loops have only one entry point, one exit point, and no branches within the loop.

Loop operation—A loop operation, when compiled and the resulting computer instructions executed on a computer, causes the computer to repeatedly execute the instructions enclosed within the loop. Each repetition of the enclosed instructions is a single iteration of the loop.

Iterative construct—An iterative construct is a series of operations that effectuate a loop operation defined by a loop statement and the body statements it encloses.

Instructions—Instructions are the compiled binary operation codes (opcodes) for a target computer architecture that implement the operation described by a statement. Often one compiled statement will describe multiple operations and generate many computer instructions.

Iteration—An iteration is a single repetition of the computer executing instructions enclosed within a loop.

Operation—An operation is described by a statement and is represented by the corresponding intermediate code. The code generation portion of a compiler converts the operations described by the intermediate code into sequences of executable instructions for a target computer architecture. These instructions, when executed on the target computer effectuate the operation.

Procedure—A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

The invention can be practiced with any programming language that utilizes loop constructs. Some of these programming languages include, but are not limited to, FORTRAN, PASCAL, C, C++, ADA and compiled BASIC. Example loop constructs in C and C++ are the "for", the "do-while", and the "while" statements. The optimization provided by the invention applies to single-basic-block-loops These loops have only one entry point, one exit point, and no branching of the flow of execution within the loop.

Figure 3:
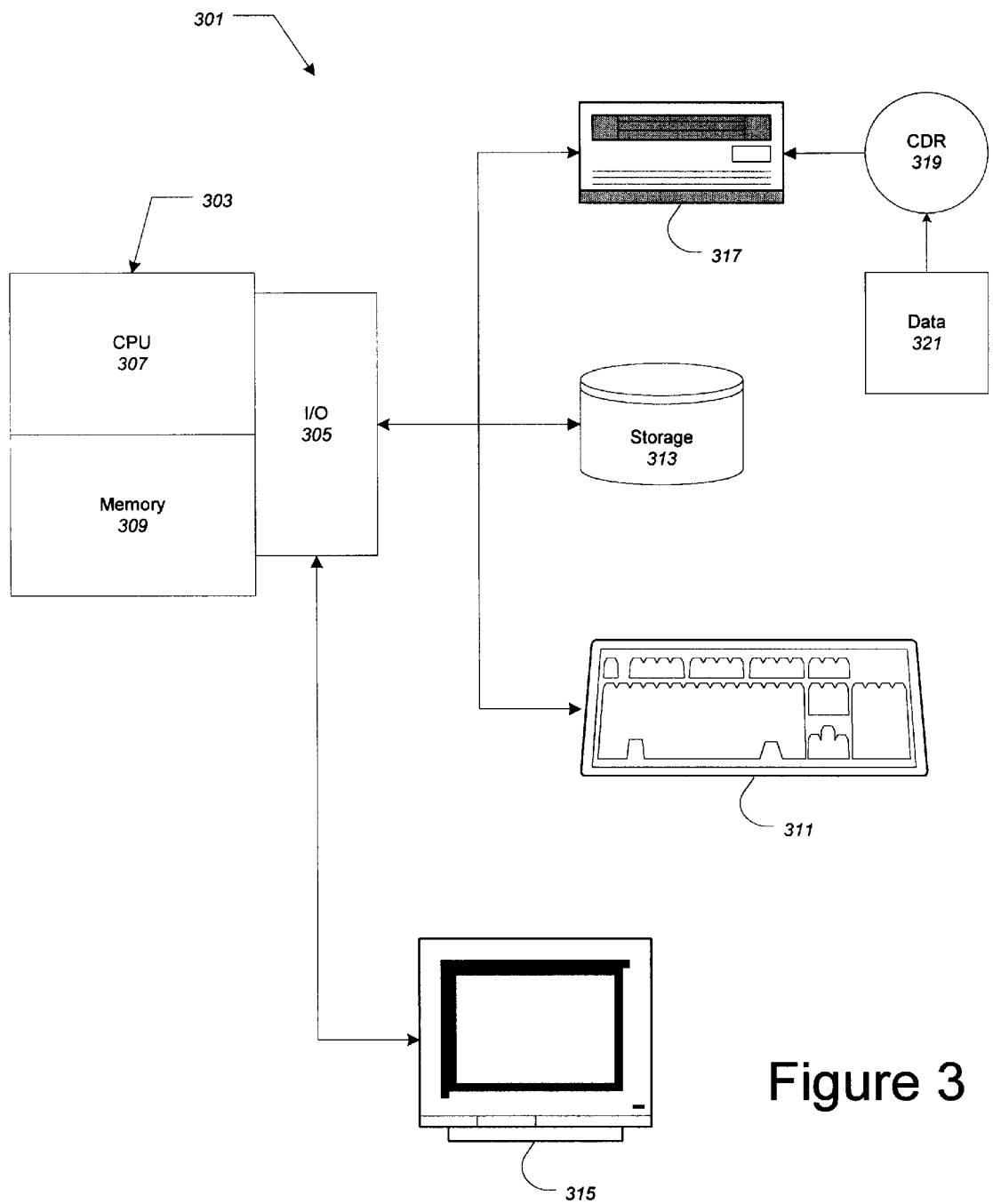
FIG. 3 illustrates elements of a computer system configured to support a compiler application in accordance with a preferred embodiment.

Some of the elements of a computer system configured to support a compiler application is shown in FIG. 3 as indicated by a general reference character 301. The computer system 301 comprises a processor 303 with an Input/Output ("I/O") section 305, a central processing unit ("CPU") 307 and a memory section 309. The I/O section 305 is connected to a keyboard 311, a disk storage unit 313, a display unit 315 and a CD-ROM drive unit 317. The CD-ROM drive unit 317 can read a CD-ROM medium 319 that typically contains programs and data 321. The CD-ROM drive unit 317, when loaded with the CD-ROM medium 319, and the disk storage unit 313 comprise a filestorage mechanism. Such a computer system is capable of executing compiler applications that embody the invention.

Figure 4:
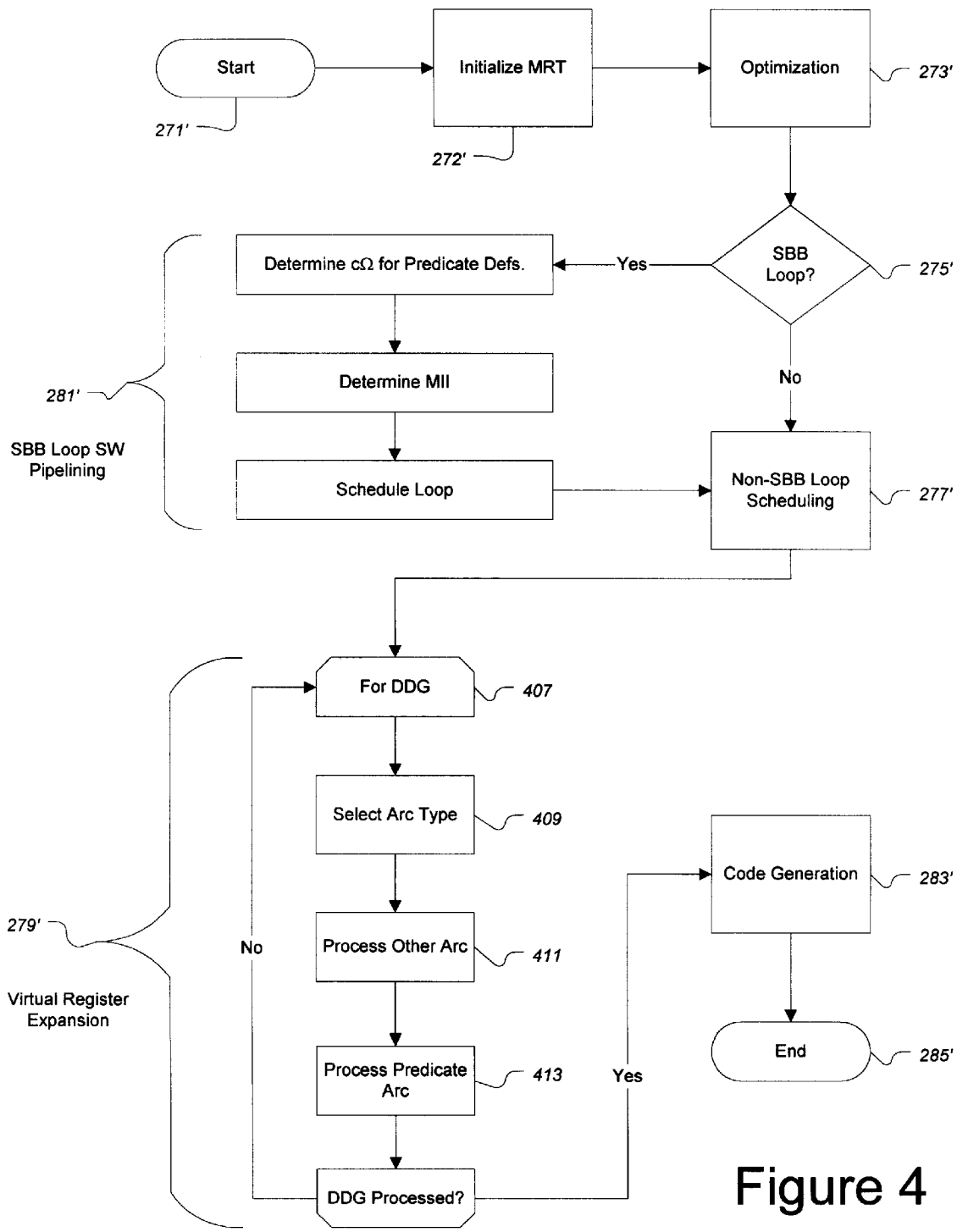
FIG. 4 illustrates a modified code generation process in accordance with a preferred embodiment.

FIG. 4 illustrates a modified code generation process, as indicated by a general reference character 270', incorporating the invention. FIG. 4 is similar to FIG. 2d and the reference characters used in FIG. 4 that correspond to the similar aspects of FIG. 2d use the same reference character as used in FIG. 2d except these reference characters are primed. Thus, a "Start" terminal 271' in FIG. 4 corresponds to the "Start" terminal 271 in FIG. 2d. An initialize MRT procedure 272' incorporates aspects of the invention and is described below. An Optimization procedure 273' provides the same operations as the Optimization procedure 273 of FIG. 2d. Further a decision procedure 275' and a "Non SBB Loop Scheduling" procedure 277' have the same operations as the corresponding procedures 275, 277 of FIG. 2d.

A modified "SBB Loop SW Pipelining" procedure 281' utilizing the invention comprises a "Determine cΩ for Predicate Defs" procedure 401. This procedure 401 determines a control omega (cΩ) for predicate registers and is described below. Once the predicate registers have cΩ arcs (predicate arcs) added to their defs in the DDG, the process continues to a "Determine Minimum II" process 403 that generates an MII taking into account the cΩ arcs. Next, the process 270' continues to a "Schedule Loop" procedure 405 that schedules the loop applying both well known scheduling techniques and inventive techniques (as described below) to the DDG.

A modified "Virtual Register Expansion" procedure 279' processes the DDG at a "For DDG" procedure 407. This procedure processes each arc and node in the DDG. When the DDG is completely processed, the process continues to the code generation procedure 283' as indicated by an arrow 408. As mentioned above, the compiler processes each arc and node on the DDG. A "Select Arc Type" procedure 409 examines the type of the arc and selects the appropriate procedure. If the arc is not a predicate arc, the process 270' continues to a "Process Other Arc" procedure 411 that uses prior art methods to allocate physical registers to virtual registers. However, if the arc is a predicate arc, the process 270' continues to a "Process Predicate Arc" procedure 413 that is described below. The process returns to the "For DDG" procedure 407 to continue processing the DDG after each arc is processed by the appropriate procedure 411, 413.

Figure 2A:
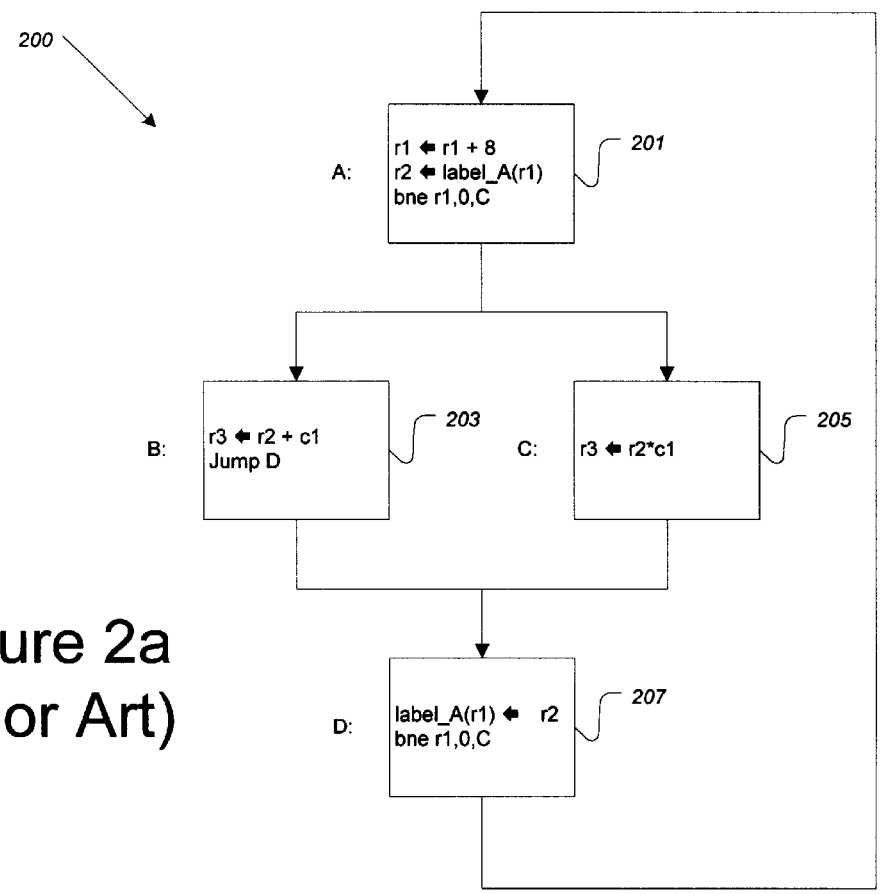
FIGS. 2a–d illustrates various prior art optimizations techniques.
Figure 2B:
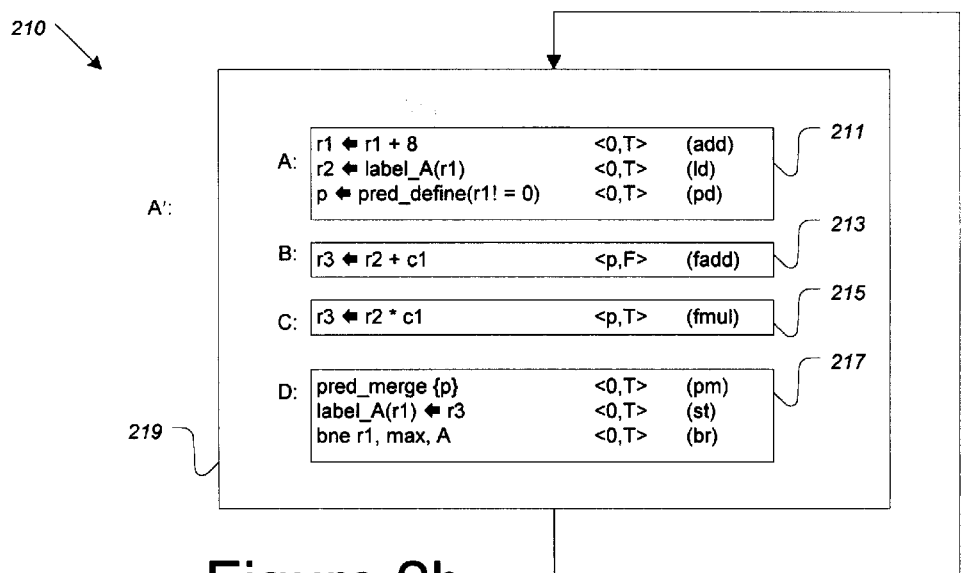
Figure 2C:
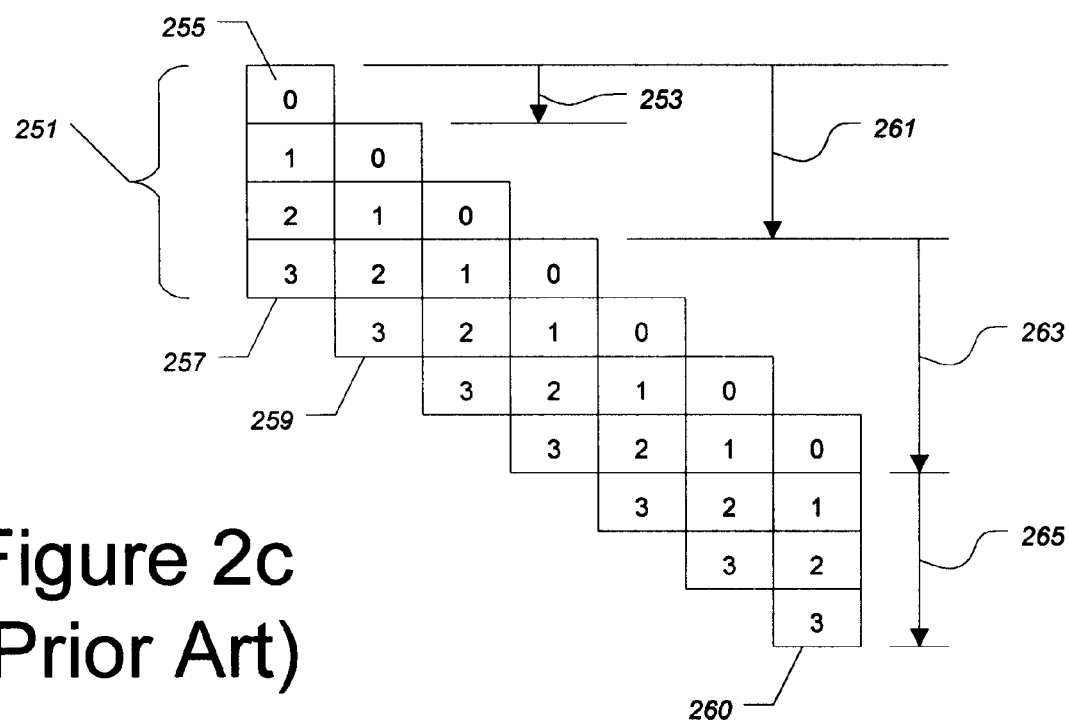
Figure 2D:
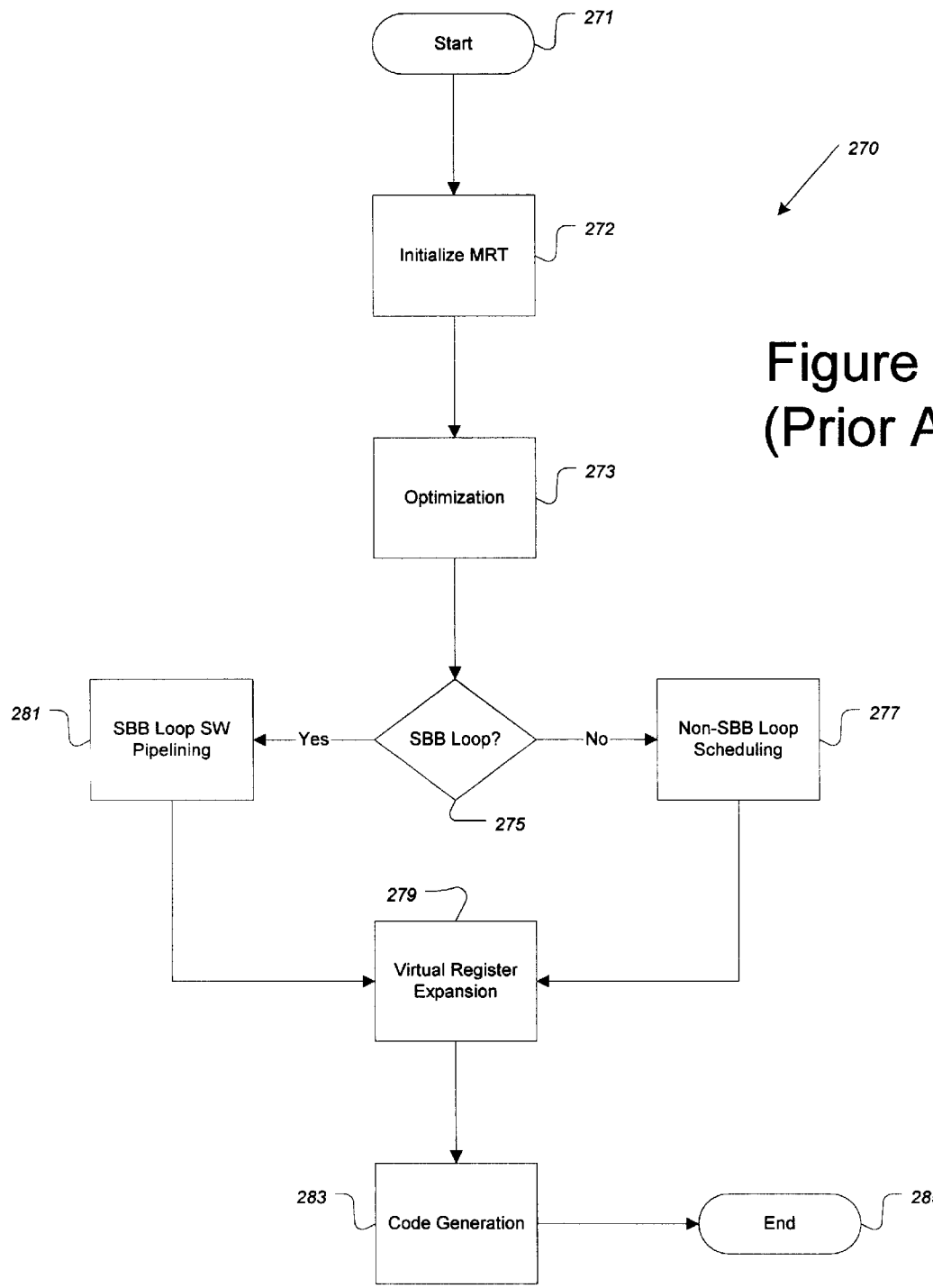

The "Code Generation" procedure 283' provides the same operations as the "Code Generation" procedure 283 of FIG. 2d. The process 270' completes through an "End" terminal 285'.

Figure 5:
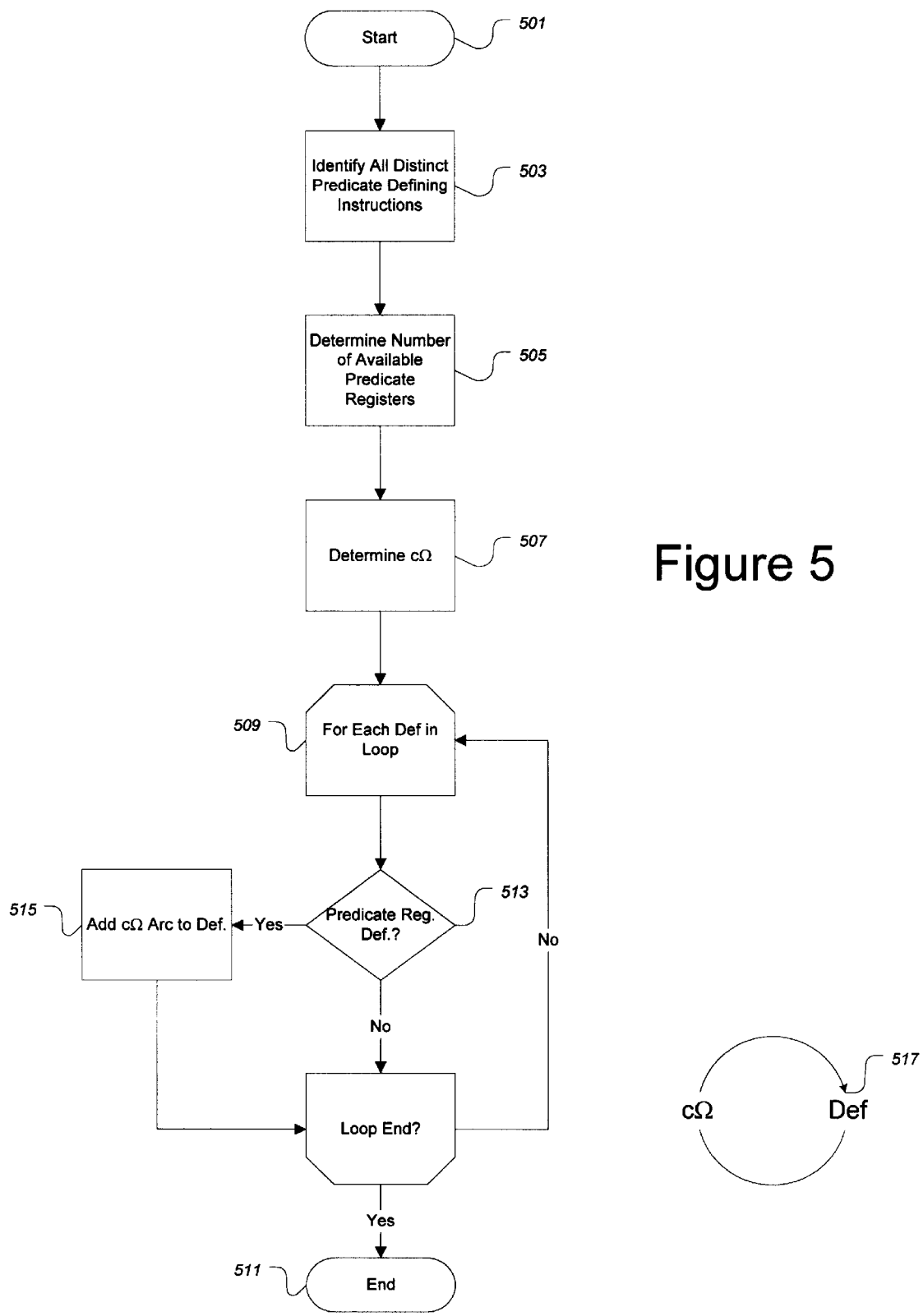
FIG. 5 illustrates a process to determine a control omega (cΩ) for unspillable predicate register definitions in accordance with a preferred embodiment.

FIG. 5 illustrates the process used in the "Determine cΩ for Predicate Defs" procedure 401 of FIG. 4. This process is indicated by a general reference character 500. The process 500 initiates at a "Start" terminal 501 and continues to an "Identify all Distinct Predicate Defining Instructions" procedure 503. This procedure 503 evaluates the instructions in the loop and identifies those that are distinct predicate defining instructions—a def of a particular predicate register. Multiple non-conflicting definitions of a predicate register are allowed and result in only one predicate register being defined (that is, only one predicate register being written). The value NDEF is the number of predicate registers defined in the loop (that is, the number of predicate registers being set within the loop). At a "Determine the Number of Available Predicate Registers" procedure 505, the process 500 determines the number of predicate registers that are available to the instructions in the loop—the number of free predicate registers. This positive or zero value is NREG. NREG is the total number of predicate registers minus the number of predicate registers that are live (in use) having a scope that spans the loop minus NDEF. That is the number of predicate registers that are available for expansion is:

NREG=Total#PredRegs−#LiveRegsAroundLoop−NDEF;

Next, at a "Determine cΩ" procedure 507, the process determines the control omega (cΩ) as:

cΩ=floor(NREG/NDEF)+1;

The value of cΩ is the largest integer not greater than the value of NREG/NDEF, plus 1. Thus, if the target computer architecture provides four predicate registers, and only one predicate registers is used in the loop, then cΩ is equal to four and the architecture supports four concurrent iterations.

However, if the cΩ is equal to one (such if three or four predicate registers are needed for the loop) only one iteration of the loop is allowed.

Next, at a "For Each Def in Loop" procedure 509 the process examines each def within the loop. After all defs in the loop have been examined, the process completes through an "End" terminal 511. Thus, for each def in the loop, a decision procedure 513 determines whether the def is a predicate register def. If the decision procedure 513 determines that the def is not a predicate register def, the process continues to the next def in the loop through the "For Each Def in Loop" procedure 509. However, if the decision procedure 513 determines that the def is a predicate register def, the process continues to an "Add cΩ Arc to Def" procedure 515. This procedure 515 adds a self output arc 517 to the def where the dependency distance of the arc is the value of the control omega cΩ. The addition of the self output arc 517 converts a resource constraint into a data dependency constraint. The process 500 continues to the procedure 509 to continue to the next def in the loop. This process results in a schedule for the loop that guarantees an allocation of the predicate registers without register spilling.

Figure 6:
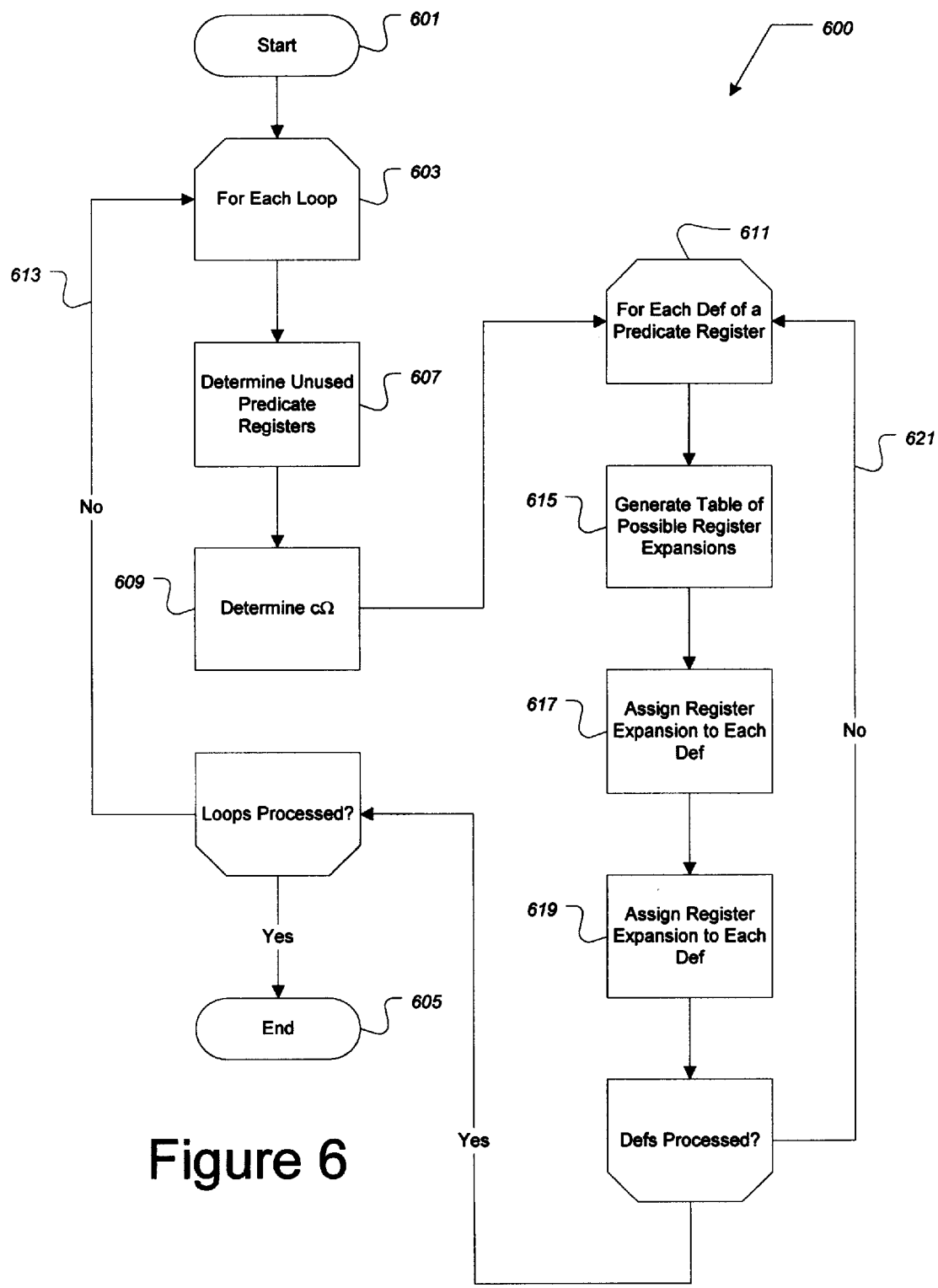
FIG. 6 illustrates a process used to assign predicate registers to definitions in accordance with a preferred embodiment.

FIG. 6 illustrates the "Process Predicate Arc" procedure 413 of FIG. 4. The procedure is indicated by a general reference character 600. The procedure 600 initiates at a "Start" terminal 601 and continues to a "For Each Loop" procedure 603 that iterates through each loop in the intermediate representation. After all loop have been processed, the procedure completes through an "End" terminal 605.

For each loop, the procedure 600 continues to a "Determine Unused Predicate Registers" procedure 607 that determines the number of unused predicate registers that are available to be used for expansion. This determination is similar to the one performed for the "Determine the Number of Available Predicate Registers" procedure 505 described above. Then, at a "Determine cΩ" procedure 609, similar to the "Determine cΩ" procedure 507 described above, the procedure 600 determines the cΩ for the loop being processed. Next, the procedure 600 advances to a "For Each Def of a Predicate Register" procedure 611 that scans the DDG representing the loop for each def that represents a predicate register. Once the entire loop is scanned and each predicate def is processed, the procedure 611 completes, as indicated by an arrow 613, though the "For Each Loop" procedure 603.

Each predicate def is processed by a "Generate Table of Possible Expansions" procedure 615 that creates a table of vectors of length cΩ. This table associates the predicate registers with the expanded virtual register names used for each simultaneously executing iteration. Thus, if there were only one predicate register required in the loop (thus cΩ=4) then the table would associate a predicate register for use for each of the four simultaneously executing iterations (assuming other bounds did not limit the number of simultaneously executing iterations below four).

At an "Assign Register Expansion to Each Def" procedure 617, the process uses the table of possible expansions generated by the procedure 615 to assign predicate registers to each def for each simultaneously executing iteration. Then, the predicate registers assigned to the defs are propagated to the uses of the def independently for each iteration by a "Propagate to Uses of the Def" procedure 619 and the process returns to the procedure 611 as indicated by an arrow 621 to process the next def.

Thus, by determining a cΩ indicating the number of simultaneously executing iterations allowed by the unspillable resources and by attaching a self output arc of order cΩ to the defs that access a unspillable resource; the resource is converted into a data constraint.

Thus, cΩ converts a resource constraint (such as an unspillable predicate register) into a data recurrence constraint. This data recurrence constraint then limits the number of simultaneously executing iterations (if the number of simultaneously executing iterations are not already more tightly limited). This technique allows the scheduling segment of the compiler to suitably limit register expansion depending on the available unspillable resource.

Figure 7A:
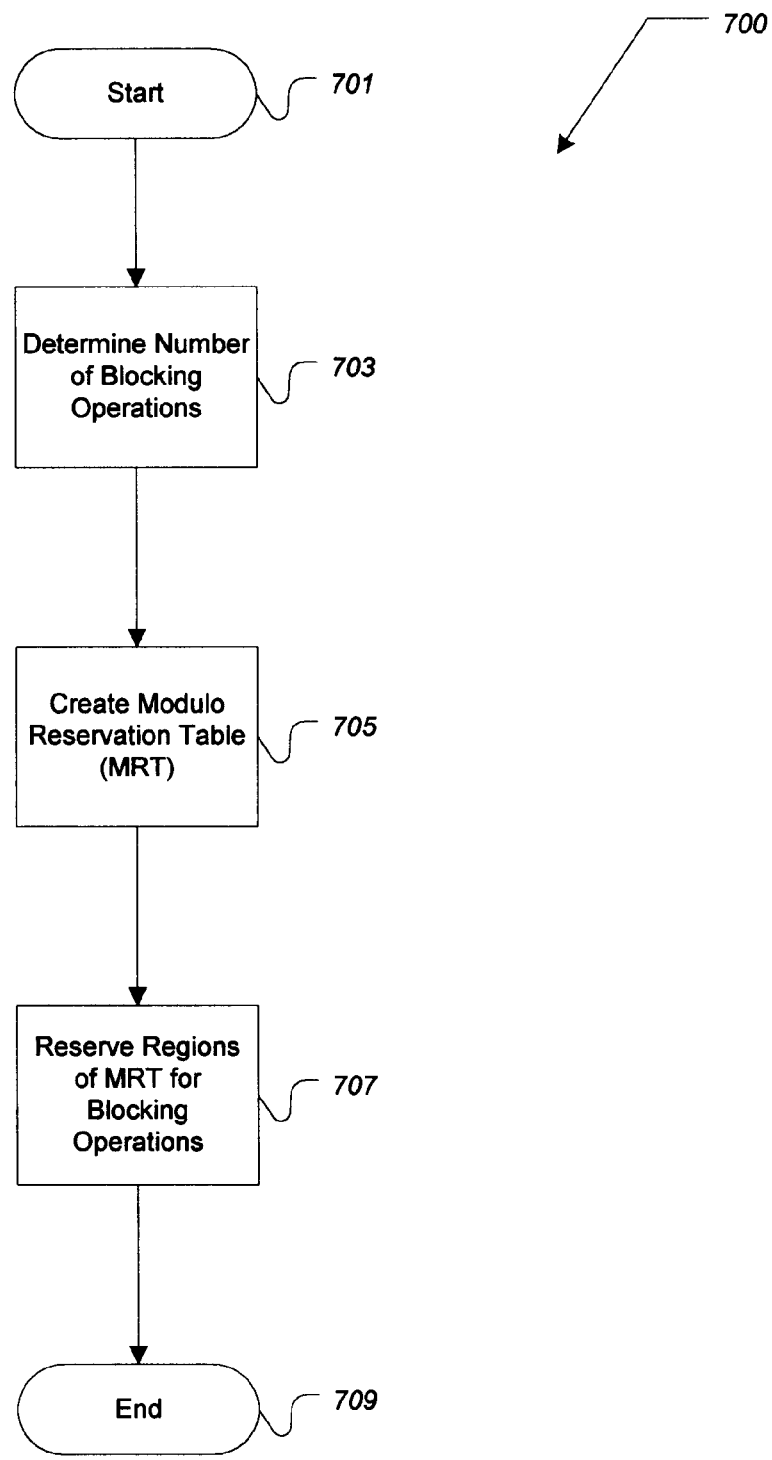
FIGS. 7a–b illustrates processes used to schedule blocking instructions in accordance with a preferred embodiment.
Figure 7B:
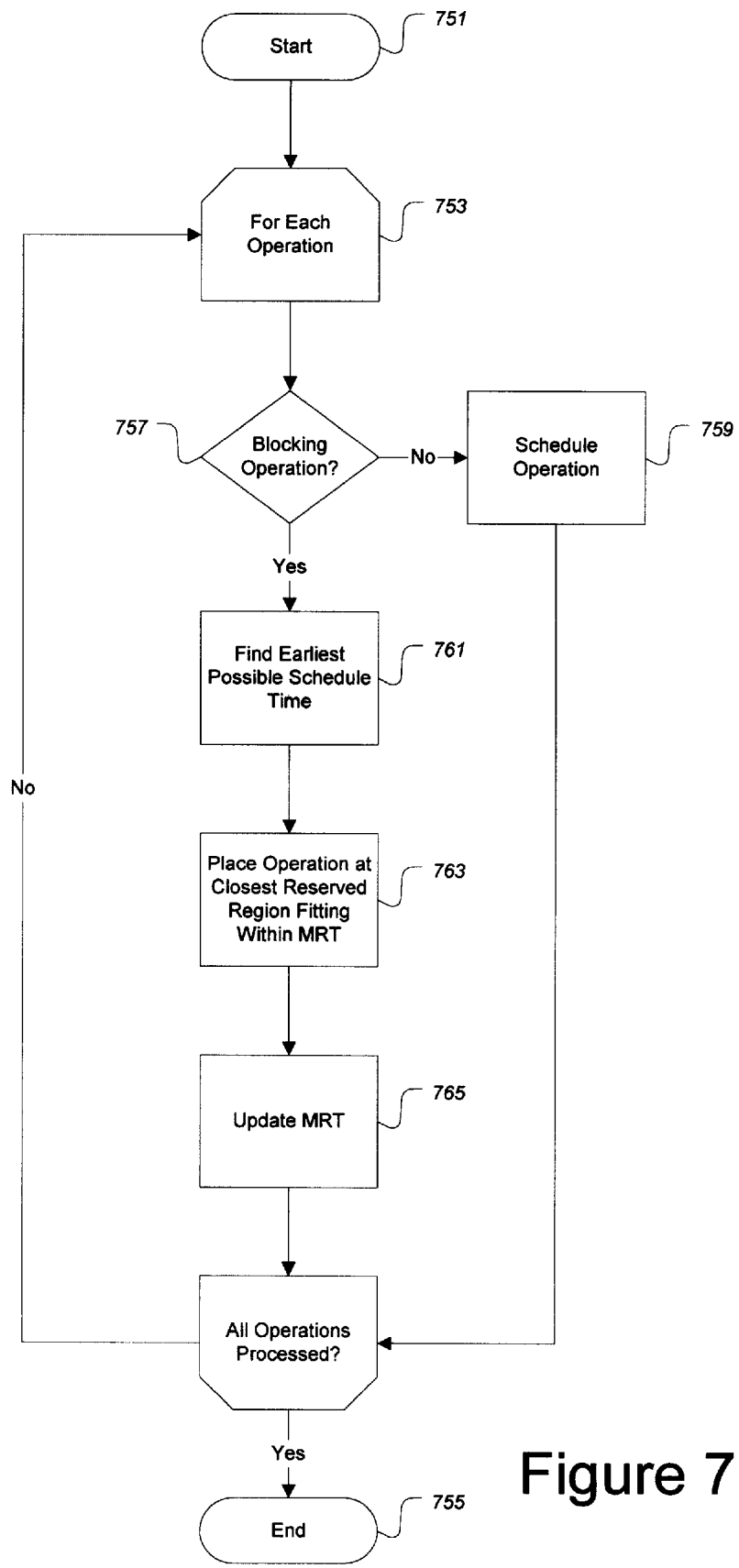

FIGS. 7a and 7b illustrates the processes to modulo schedule blocking operations such as the divide and square root operations without requiring an increase in the II due to fragmentation of the MRT. This process pre-reserves space in the MRT for the blocking operations in the loop so that subsequent scheduling operations of non-blocking operations will not so fragment the MRT that the II must be increased to allow a schedule.

FIG. 7a illustrates the process used to initialize the MRT for the loop as shown by the general reference character 700. This process is invoked through the initialize MRT procedure 272' of FIG. 4. The process initiates at a "Start" terminal 701 and continues to a procedure 703 that determines the number of blocking operations in the loop. A "Create Modulo Reservation Table" procedure 705 uses the value determined in the procedure 703 and creates a modulo reservation table (MRT) with sufficient slots as is appropriate for the II of the loop. Next, the process continues to a procedure 707 that pre-allocates (reserves) a dedicated scheduling region (that is, consecutive slots) in the MRT to contain the blocking operations within the loop. By preallocating the dedicated scheduling regions in the MRT for the blocking operations, subsequent pipelined operations will not be scheduled in these reserved dedicated scheduling regions; hence scheduling of blocking operations will not be impacted due to subsequent fragmentation the MRT due to pipelined operations. One skilled in the art will understand that the dedicated scheduling region is dedicated to blocking operations as a group, not to specific blocking operations. Finally, the process completes through an "End" terminal 709.

FIG. 7b illustrates the process used to schedule blocking operations as indicated by a general reference character 750. The process is invoked by the "Schedule Loop" process 405 of FIG. 4 and initiates through a "Start" terminal 751. The process examines each operation in the loop starting at a "For Each Operation" procedure 753. If all the loop operations have been processed, as described below, the process completes through an "End" terminal 755.

Each operation is evaluated at a "Blocking Operation" decision procedure 757 to determine whether the operation is a blocking operation or a non-blocking operation. If the operation is a non-blocking operation, the process continues to a "Schedule Operation" procedure 759 that performs modulo scheduling of the operation. However, if the operation is a blocking operation, the process 750 continues from the decision procedure 757 to a procedure 761 that locates the earliest operation in the MRT that has been reserved and is available for scheduling blocking operations. Once this MRT location is found, the process continues to a procedure 763 that schedules the operation within this earliest reserved area of the MRT. Next at an "Update the MRT" procedure 765 the process marks the reserved area now occupied by the blocking instruction as used and the process continues at the "For Each Operation" procedure 753.

One skilled in the art will understand that the invention as described above teaches a method, apparatus, system and computer programmed product that improves the optimization capabilities of compilers.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method of optimizing a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop, said method comprising steps of:

a. detecting that said loop statement contains at least one body statement that results in a def of an unspillable resource;
   b. determining a control omega value for said iterative construct;
   c. converting said def into a data constraint using said control omega value;
   d. scheduling said iterative construct; and
   e. allocating said unspillable resource dependent on said data constraint.

2. The computer controlled method of claim 1 wherein said unspillable resource is a predicate register.

3. The computer controlled method of claim 1 wherein said loop statement results in a data dependency graph, said def represented by a def node in said data dependency graph, and step (c) further comprises steps of:

(c1) adding a self output arc to said def node; and
   (c2) assigning said control omega value to said self output arc.

4. The computer controlled method of claim 3 wherein said data dependency graph further comprises a use node connected to said def node by an arc, and step (e) further comprises steps of:

(e1) determining a plurality of available unspillable resources;
   (e2) assigning a first unspillable resource of said plurality of available unspillable resources to said def node; and
   (e3) propagating said first unspillable resource from said def node to said use node.

5. The computer controlled method of claim 1 wherein step (b) comprises steps of:

(b1) determining a number of distinct unspillable resources used by said iterative construct;
   (b2) determining a number of available unspillable resources available for use by said iterative construct; and
   (b3) determining said control omega value from said number of distinct unspillable resources and said number of available unspillable resources.

6. A computer controlled method of optimizing a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop, said method comprising steps of:

a. detecting that said loop statement contains at least one body statement that8 invokes a blocking operation;
   b. pre-allocating at least one dedicated scheduling region reserved for said blocking operation;
   c. scheduling said blocking operation within said dedicated scheduling region;
   d. creating a modulo reservation table (MRT) used to schedule a plurality of operations for a plurality of iterative constructs making up said loop; and
   e. pre-allocating said dedicated scheduling region within said MRT for each of said plurality of iterative constructs.

7. A computer system having a central processing unit (CPU) and a memory coupled to said CPU, for optimizing a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop, said computer system having a compiler system with a code generator segment; said computer system comprising:

a. a loop detection mechanism configured to detect that said loop statement contains at least one body statement that results in a def of an unspillable resource;
   b. a control omega determination mechanism configured to determine a control omega value for said iterative construct representative of said loop statement;
   c. a conversion mechanism configured to convert said def into a data constraint using said control omega value;
   d. a scheduling mechanism configured to schedule said iterative construct using said data constraint; and
   e. an allocation mechanism configured to allocate said unspillable resource dependent on said data constraint.

8. The computer system of claim 7 wherein said unspillable resource is a predicate register.

9. The computer system of claim 7 wherein said loop statement results in a data dependency graph, said def represented by a def node in said data dependency graph, and said conversion mechanism further comprising:

an arc addition mechanism configured to add a self output arc to said def node; and
   an omega assignment mechanism configured to assign said control omega value to said self output arc.

10. The computer system of claim 9 wherein said data dependency graph further comprises a use node connected to said def node by an arc, and said allocation mechanism further comprising:

an available resource determination mechanism configured to determine a plurality of available unspillable resources;
   a resource assignment mechanism configured to assign a first unspillable resource of said plurality of available unspillable resources to said def node; and
   a resource propagation mechanism configured to propagate said first unspillable resource from said def node to said use node.

11. The computer system of claim 7 wherein said control omega determination mechanism further comprising:

a resource determination mechanism configured to determine a number of distinct unspillable resources used by said iterative construct;
   an available resource determination mechanism configured to determine a number of available unspillable resources available for use by said iterative construct; and a control omega determination mechanism configured to determine said control omega value from said number of distinct unspillable resources and said number of available unspillable resources.

12. A computer system, having a central processing unit (CPU) and a memory coupled to said CPU, for optimizing a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop, said computer system having a compiler system with a code generator segment; said computer system comprising:

a. a blocking statement detection mechanism configured to detect that said loop statement contains at least one body statement that invokes a blocking operation;

b. an allocation mechanism configured to pre-allocate at least one dedicated scheduling region reserved for said blocking operation;

c. a scheduling mechanism configured to schedule said blocking operation within said dedicated scheduling region;

d. a modulo reservation table creation mechanism configured to create a modulo reservation table (MRT) used to schedule a plurality of operations for a plurality of iterative constructs making up said loop; and e. a pre-allocation mechanism configured to pre-allocate said dedicated scheduling region within said MRT for each of said plurality of iterative constructs.

13. An apparatus having a central processing unit (CPU) and a memory coupled to said CPU, for optimizing a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop said apparatus having a compiler system with a code generator segment; said apparatus comprising:

a. a loop detection mechanism configured to detect that said loop statement contains at least one body statement that results in a def of an unspillable resource;

b. a control omega determination mechanism configured to determine a control omega value for said iterative construct representative of said loop statement;

c. a conversion mechanism configured to convert said def into a data constraint using said control omega value;

d. a scheduling mechanism configured to schedule said iterative construct using said data constraint; and e. an allocation mechanism configured to allocate said unspillable resource dependent on said data constraint.

14. The apparatus of claim 13 wherein said unspillable resource is a predicate register.

15. The apparatus of claim 13 wherein said loop statement results in a data dependency graph, said def represented by a def node in said data dependency graph, and said conversion mechanism further comprising:

an arc addition mechanism configured to add a self output arc to said def node; and an omega assignment mechanism configured to assign said control omega value to said self output arc.

16. The apparatus of claim 15 wherein said data dependency graph further comprises a use node connected to said def node by an arc, and said allocation mechanism further comprises:

an available resource determination mechanism configured to determine a plurality of available unspillable resources;

a resource assignment mechanism configured to assign a first unspillable resource of said plurality of available unspillable resources to said def node; and a resource propagation mechanism configured to propagate said first unspillable resource from said def node to said use node.

17. The apparatus of claim 13 wherein said control omega determination mechanism further comprises:

a resource determination mechanism configured to determine a number of distinct unspillable resources used by said iterative construct;

an available resource determination mechanism configured to determine a number of available unspillable resources available for use by said iterative construct; and a control omega determination mechanism configured to determine said control omega value from said number of distinct unspillable resources and said number of available unspillable resources.

18. An apparatus, having a central processing unit (CPU) and a memory coupled to said CPU, for optimizing a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop, said apparatus having a compiler system with a code generator segment; said apparatus comprising:

a. a blocking statement detection mechanism configured to detect that said loop statement contains at least one body statement that invokes a blocking operation;

b. an allocation mechanism configured to pre-allocate at least one dedicated scheduling region reserved for said blocking operation;

c. a scheduling mechanism configured to schedule said blocking operation within said dedicated scheduling region;

d. a modulo reservation table creation mechanism configured to create a modulo reservation table (MRT) used to schedule a plurality of operations for a plurality of iterative constructs making up said loop; and e. a pre-allocation mechanism configured to pre-allocate said dedicated scheduling region within said MRT for each of said plurality of iterative constructs.

19. A computer program product including a computer usable storage medium having computer readable code embodied therein for causing a computer to optimize a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop; said computer readable code comprising:

a. computer readable program code devices configured to cause said computer to effect a loop detection mechanism configured to detect that said loop statement contains at least one body statement that results in a def of an unspillable resource;

b. computer readable program code devices configured to cause said computer to effect a control omega determination mechanism configured to determine a control omega value for said iterative construct representative of said loop statement;

c. computer readable program code devices configured to cause said computer to effect a conversion mechanism configured to convert said def into a data constraint using said control omega value;

d. computer readable program code devices configured to cause said computer to effect a scheduling mechanism configured to schedule said iterative construct using said data constraint; and e. computer readable program code devices configured to cause said computer to effect an allocation mechanism configured to allocate said unspillable resource dependent on said data constraint.

20. The computer program product of claim 19 wherein said unspillable resource is a predicate register.

21. The computer program product of claim 19 wherein said loop statement results in a data dependency graph, said def represented by a def node in said data dependency graph, and said conversion mechanism further comprising:

computer readable program code devices configured to cause said computer to effect an arc addition mechanism configured to add a self output arc to said def node; and computer readable program code devices configured to cause said computer to effect an omega assignment mechanism configured to assign said control omega value to said self output arc.

22. The computer program product of claim 21 wherein said data dependency graph further comprises a use node connected to said def node by an arc, and said allocation mechanism further comprising:

computer readable program code devices configured to cause said computer to effect an available resource determination mechanism configured to determine a plurality of available unspillable resources;

computer readable program code devices configured to cause said computer to effect a resource assignment mechanism configured to assign a first unspillable resource of said plurality of available unspillable resources to said def node; and computer readable program code devices configured to cause said computer to effect a resource propagation mechanism configured to propagate said first unspillable resource from said def node to said use node.

23. The computer program product of claim 19 wherein said control omega determination mechanism further comprises:

computer readable program code devices configured to cause said computer to effect a resource determination mechanism configured to determine a number of distinct unspillable resources used by said iterative construct;

computer readable program code devices configured to cause said computer to effect an available resource determination mechanism configured to determine a number of available unspillable resources available for use by said iterative construct; and computer readable program code devices configured to cause said computer to effect a control omega determination mechanism configured to determine said control omega value from said number of distinct unspillable resources and said number of available unspillable resources.

24. A computer program product including a computer usable storage medium having computer readable code embodied therein for causing a computer to optimize a loop statement within a target program directed at a target computer architecture having a plurality of parallel computation units that facilitate instruction pipelining and that permits two or more instructions to be issued in a single clock cycle, said loop statement describing an iterative construct, said loop statement having the characteristics of a single basic block loop; said computer readable code comprising:

computer readable program code devices configured to cause said computer to effect a blocking statement detection mechanism configured to detect that said loop statement contains at least one body statement that invokes a blocking operation;

computer readable program code devices configured to cause said computer to effect an allocation mechanism configured to pre-allocate at least one dedicated scheduling region reserved for said blocking operation;

computer readable program code devices configured to cause said computer to effect a scheduling mechanism configured to schedule said blocking operation within said dedicated scheduling region;

computer readable program code devices configured to cause said computer to effect a modulo reservation table creation mechanism configured to create a modulo reservation table (MRT) used to schedule a plurality of operations for a plurality of iterative constructs making up said loop; and computer readable program code devices configured to cause said computer to effect a pre-allocation mechanism configured to pre-allocate said dedicated scheduling region within said MRT for each of said plurality of iterative constructs.

* * * * *